United States Patent
Nation et al.

(10) Patent No.: US 10,536,224 B1
(45) Date of Patent: Jan. 14, 2020

(54) VISUALIZING ARBITRARY PULSE SHAPES AND SCHEDULES IN QUANTUM COMPUTING APPLICATIONS

(71) Applicant: International Business Machines Corporation, Armonk, NY (US)

(72) Inventors: Paul Nation, Yorktown Heights, NY (US); Naoki Kanazawa, Yokohama (JP); Thomas Arab Alexander, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/285,396

(22) Filed: Feb. 26, 2019

(51) Int. Cl.
| | |
|---|---|
| H04B 10/00 | (2013.01) |
| H04B 10/70 | (2013.01) |
| G06F 16/9038 | (2019.01) |
| G06N 10/00 | (2019.01) |
| H04J 14/00 | (2006.01) |

(52) U.S. Cl.
CPC ......... *H04B 10/70* (2013.01); *G06F 16/9038* (2019.01); *G06N 10/00* (2019.01)

(58) Field of Classification Search
CPC ......... H04B 10/70; H04B 10/90; G05N 10/00
See application file for complete search history.

(56) References Cited

U.S. PATENT DOCUMENTS

| | | | |
|---|---|---|---|
| 9,030,731 B2 | 5/2015 | Arahira | |
| 9,425,804 B2 | 8/2016 | McDermott, III et al. | |
| 10,063,228 B2 | 8/2018 | Deurloo et al. | |
| 2006/0010182 A1 | 1/2006 | Altepeter et al. | |
| 2018/0260245 A1 | 9/2018 | Smith | |
| 2019/0049495 A1* | 2/2019 | Ofek | G06N 10/00 |
| 2019/0087743 A1* | 3/2019 | Heeres | G06N 10/00 |

FOREIGN PATENT DOCUMENTS

WO 2005106645 A2 11/2005

OTHER PUBLICATIONS

Bowler, et al., Arbitrary Waveform Generator for Quantum Information Processing with Trapped Ions, Feb. 28, 2013, 6 pages.
Nation, et al. "Representing the Operation of a Quantum Computing Device Over Time." U.S. Appl. No. 16/436,321, filed Jun. 10, 2019. 52 pages.

* cited by examiner

*Primary Examiner* — Daniel G Dobson
(74) *Attorney, Agent, or Firm* — Amin, Turocy & Watson, LLP

(57) ABSTRACT

Systems, computer-implemented methods, and computer program products to facilitate visualizing arbitrary pulse shapes and schedules in quantum computing applications are provided. According to an embodiment, a system can a processor that can execute computer executable components stored in memory. The system can further comprise a collection component that can receive a pulse schedule of pulse data and control parameters of a quantum device comprising default pulse data of the quantum device. The system can further comprise a plotting component that can generate a plot of the pulse schedule based on the pulse data, the control parameters, and the default pulse data. The system can further comprise a visualization component that can generate a display of the pulse schedule.

20 Claims, 11 Drawing Sheets

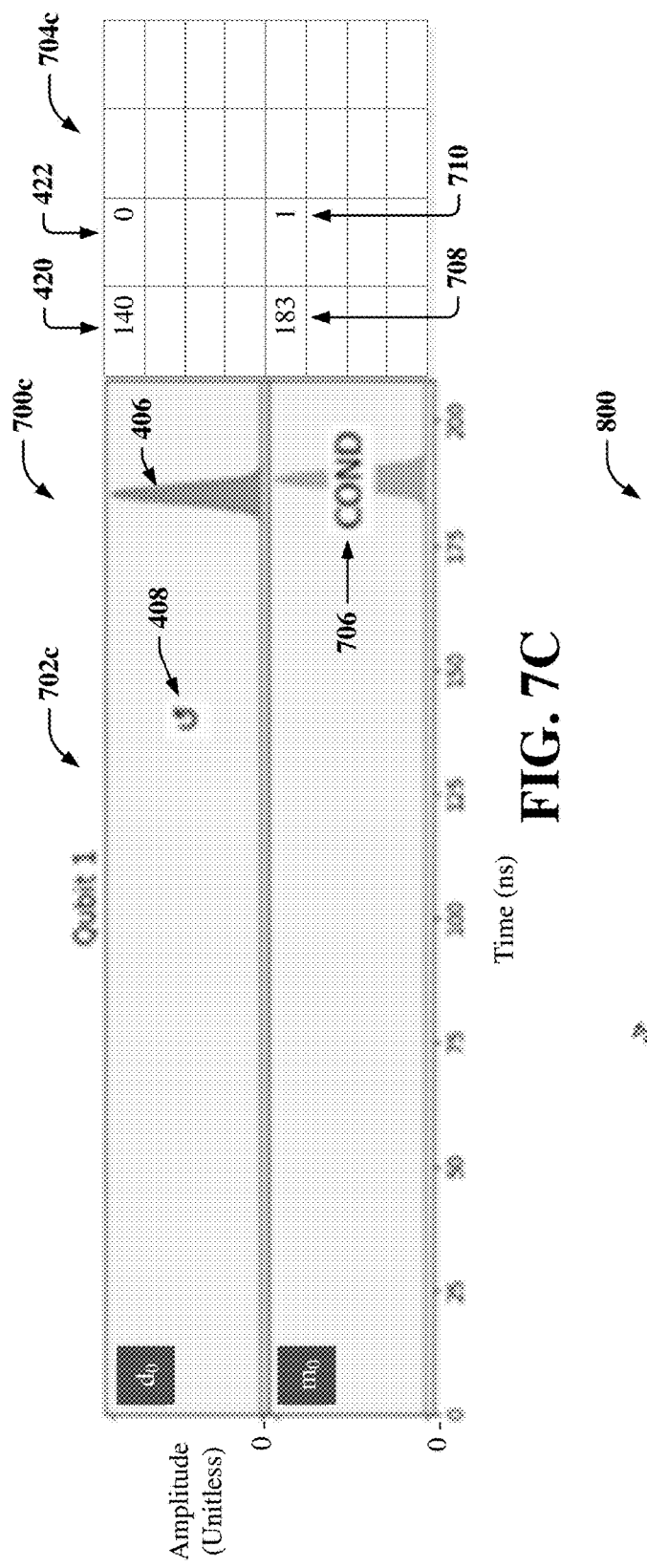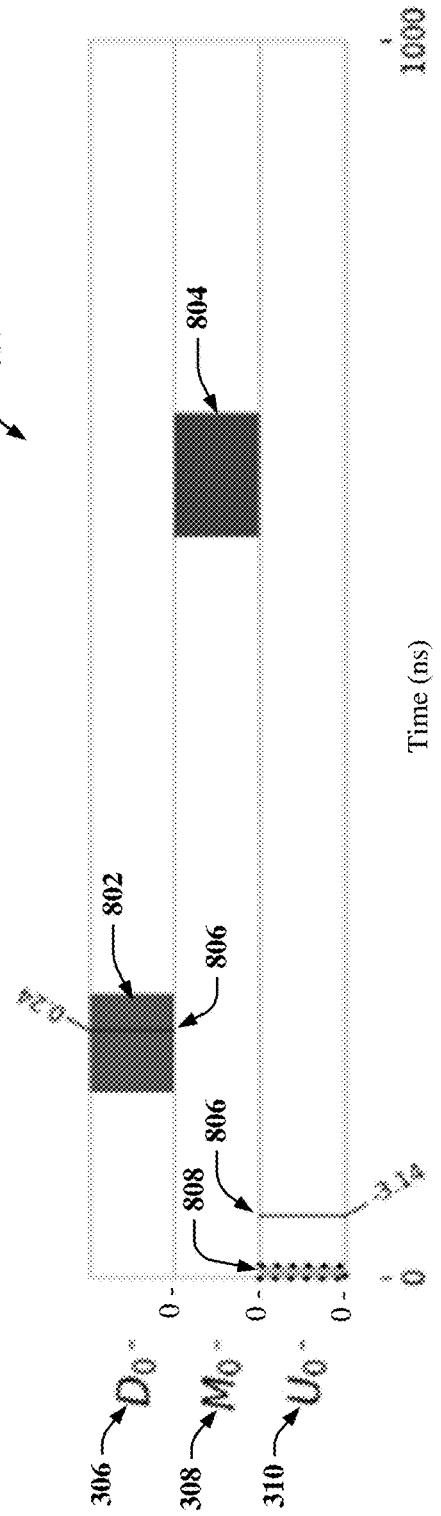
FIG. 7C
FIG. 8

VISUALIZING ARBITRARY PULSE SHAPES AND SCHEDULES IN QUANTUM COMPUTING APPLICATIONS

BACKGROUND

The subject disclosure relates to pulse shapes and schedules in quantum computing applications, and more specifically, to visualizing arbitrary pulse shapes and schedules in quantum computing applications.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, and/or computer program products that can facilitate visualizing arbitrary pulse shapes and schedules in quantum computing applications are described.

According to an embodiment, a system can a processor that can execute computer executable components stored in memory. The system can further comprise a collection component that can receive a pulse schedule of pulse data and control parameters of a quantum device comprising default pulse data of the quantum device. The system can further comprise a plotting component that can generate a plot of the pulse schedule based on the pulse data, the control parameters, and the default pulse data. The system can further comprise a visualization component that can generate a display of the pulse schedule.

According to an embodiment, a computer-implemented method can comprise executing, by a processor, computer executable components stored in memory. The computer-implemented method can further comprise receiving, by a device operatively coupled to the processor, a pulse schedule of pulse data and control parameters of a quantum device comprising default pulse data of the quantum device. The computer-implemented method can further comprise generating, by the device, a plot of the pulse schedule based on the pulse data, the control parameters, and the default pulse data. The computer-implemented method can further comprise generating, by the device, a display of the pulse schedule.

According to another embodiment, a computer program product that can facilitate generating a visualization associated with a quantum device. The computer program product can comprise a computer readable storage medium having program instructions embodied therewith, the program instructions can be executable by a processor to cause the processor to execute, by the processor, computer executable components stored in memory. The program instructions can be further executable to cause the processor to receive, by the processor, a pulse schedule of pulse data and control parameters of a quantum device comprising default pulse data of the quantum device. The program instructions can be further executable to cause the processor to generate, using the processor, a plot of the pulse schedule based on the pulse data, the control parameters, and the default pulse data. The program instructions can be further executable to cause the processor to generate, using the processor, a display of the pulse schedule.

DESCRIPTION OF THE DRAWINGS

FIGS. 7A, 7B, and 7C illustrate example, non-limiting visualizations that can facilitate visualizing arbitrary pulse shapes and schedules in quantum computing applications in accordance with one or more embodiments described herein.

FIG. 8 illustrates an example, non-limiting visualization that can facilitate visualizing arbitrary pulse shapes and schedules in quantum computing applications in accordance with one or more embodiments described herein.

DETAILED DESCRIPTION

Figure 1:
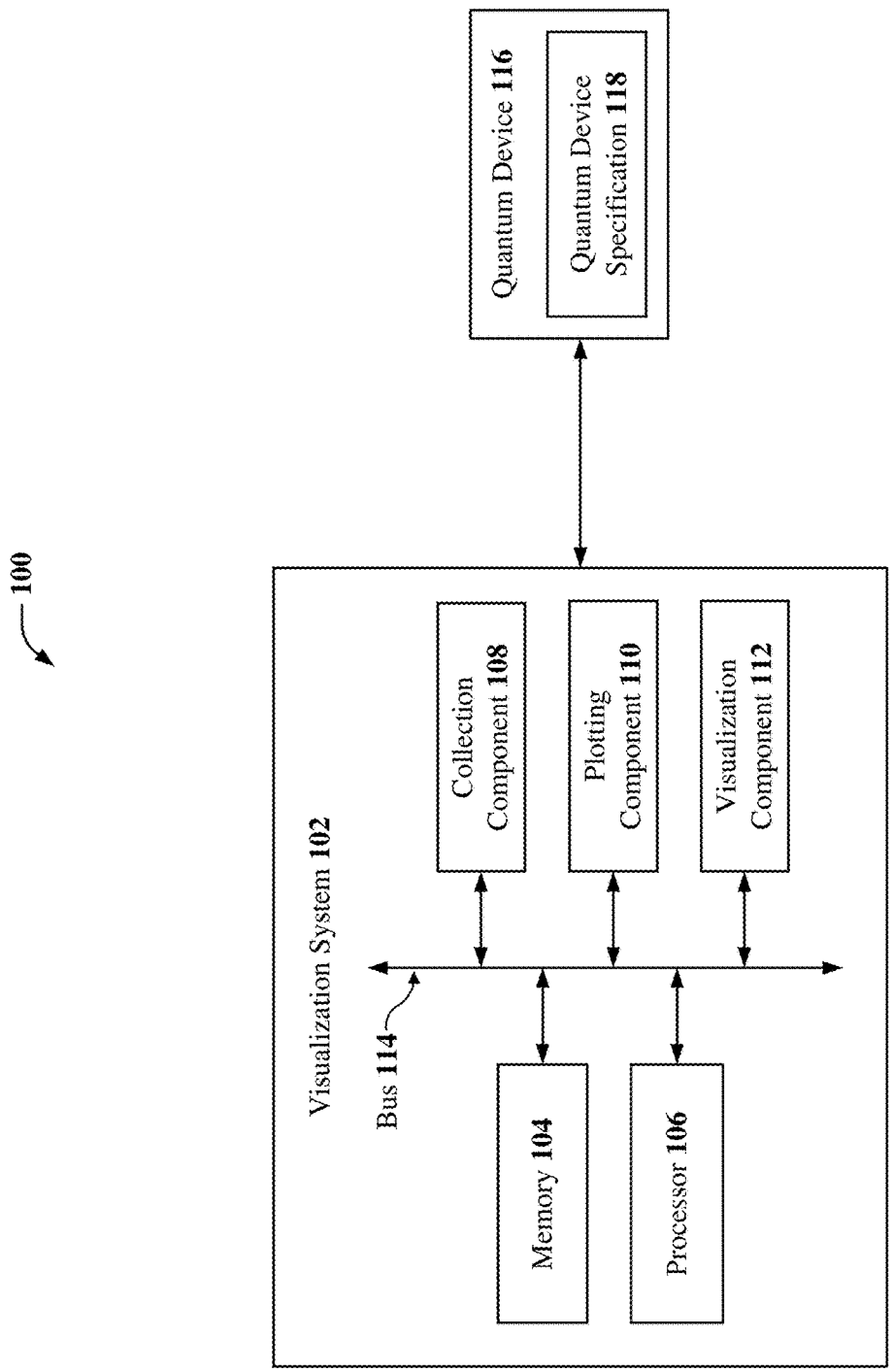
FIG. 1 illustrates a block diagram of an example, non-limiting system that can facilitate visualizing arbitrary pulse shapes and schedules in quantum computing applications in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits that comprise superpositions of both 0 and 1, can entangle multiple quantum bits (qubits), and use interference.

Quantum computing hardware is different from classical computing hardware. In particular, superconducting quantum circuits generally rely on Josephson junctions, which can be fabricated on a semiconductor substrate. A Josephson junction generally manifests the Josephson effect of a supercurrent, where current can flow indefinitely across a Josephson junction without an applied voltage. One or more Josephson junctions can be embedded in a superconducting circuit to form a quantum bit (qubit). A plurality of such qubits can be arranged in a superconducting quantum circuit fabricated on a semiconductor substrate, which can further comprise microwave readout resonators coupled to the respective qubits that facilitate reading quantum information of the qubits. Such a superconducting quantum circuit and microwave readout resonators can be integrated onto a semiconducting substrate to form an integrated quantum processor that can execute computations and information processing functions that are substantially more complex than can be executed by classical computing devices (e.g., general-purpose computers, special-purpose computers, etc.).

Building quantum computers with longer coherence times and lower gate errors requires going beyond simple pulse definitions (e.g., Gaussian pulse shapes) as the underlying control for gate operations and moving to more complex single-pulse or multi-pulse schemes based on, for instance, quantum optimal control, dynamical decoupling, and/or machine learning algorithms Being generated by machine algorithms, these complex and often times non-analytic pulse shapes and schedules are better understood through visualization.

FIG. 1 illustrates a block diagram of an example, non-limiting system 100 that can facilitate visualizing arbitrary pulse shapes and schedules in quantum computing applications in accordance with one or more embodiments described herein. According to several embodiments, system 100 can comprise a visualization system 102 and/or a quantum device 116. In some embodiments, visualization system 102 can comprise a memory 104, a processor 106, a collection component 108, a plotting component 110, a visualization component 112, and/or a bus 114. In some embodiments, quantum device 116 can comprise a quantum device specification 118.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, visualization system 102 and/or quantum device 116 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIG. 1 or other figures disclosed herein.

According to multiple embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to visualization system 102, collection component 108, plotting component 110, visualization component 112, quantum device 116, quantum device specification 118, and/or another component associated with system 100 and/or visualization system 102, as described herein with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor. Further examples of processor 106 are described below with reference to processing unit 1014 and FIG. 10. Such examples of processor 106 can be employed to implement any embodiments of the subject disclosure.

In some embodiments, visualization system 102, memory 104, processor 106, collection component 108, plotting component 110, visualization component 112, and/or another component of visualization system 102 as described herein can be communicatively, electrically, and/or operatively coupled to one another via a bus 114 to perform functions of system 100, visualization system 102, and/or any components coupled therewith. In several embodiments, bus 114 can comprise one or more memory bus, memory controller, peripheral bus, external bus, local bus, and/or another type of bus that can employ various bus architectures. Further examples of bus 114 are described below with reference to system bus 1018 and FIG. 10. Such examples of bus 114 can be employed to implement any embodiments of the subject disclosure.

In some embodiments, visualization system 102 and/or quantum device 116 can comprise any type of component, machine, device, facility, apparatus, and/or instrument that comprises a processor and/or can be capable of effective and/or operative communication with a wired and/or wireless network. All such embodiments are envisioned. For example, visualization system 102 and/or quantum device 116 can comprise a server device, a computing device, a general-purpose computer, a special-purpose computer, a quantum computing device (e.g., a quantum computer, a quantum processor, etc.), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, visualization system 102 and/or quantum device 116 can be coupled (e.g., communicatively, electrically, operatively, etc.) to one or more external systems, sources, and/or devices (e.g., computing devices, communication devices, etc.) via a data cable (e.g., coaxial cable, High-Definition Multimedia Interface (HDMI), recommended standard (RS) 232, Ethernet cable, etc.). In some embodiments, visualization system 102 and/or quantum device 116 can be coupled (e.g., communicatively, electrically, operatively, etc.) to one or more external systems, sources, and/or devices (e.g., computing devices, communication devices, etc.) via a network.

According to multiple embodiments, such a network can comprise wired and wireless networks, including, but not limited to, a cellular network, a wide area network (WAN) (e.g., the Internet) or a local area network (LAN). For example, visualization system 102 and/or quantum device 116 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, visualization system 102 and/or quantum device 116 can thus include hardware (e.g., a central processing unit (CPU), a transceiver, a decoder), software (e.g., a set of threads, a set of processes, software in execution) or a combination of hardware and software that facilitates communicating information between visualization system 102 and/or quantum device 116 and external systems, sources, and/or devices (e.g., computing devices, communication devices, etc.).

According to multiple embodiments, visualization system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with visualization system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, collection component 108, plotting component 110, visualization component 112, and/or any other components associated with visualization system 102 as disclosed herein (e.g., communicatively, electronically, and/or operatively coupled with and/or employed by visualization system 102), can comprise such computer and/or machine readable, writable, and/or executable component(s) and/or instruction(s). Consequently, according to numerous embodiments, visualization system 102 and/or any components associated therewith as disclosed herein, can employ processor 106 to execute such computer and/or machine readable, writable, and/or executable component(s) and/or instruction(s) to facilitate performance of one or more operations described herein with reference to visualization system 102 and/or any such components associated therewith.

In some embodiments, visualization system 102 can facilitate performance of operations executed by and/or associated with collection component 108, plotting component 110, visualization component 112, quantum device 116, quantum device specification 118, and/or another component associated with visualization system 102 as disclosed herein. For example, as described in detail below, visualization system 102 can facilitate: executing computer executable components stored in memory; receiving a pulse schedule of pulse data and control parameters of a quantum device comprising default pulse data of the quantum device; generating a plot of the pulse schedule; generating a display of the pulse schedule; interpolating discrete pulses received from the quantum device; generating a display of time duration of the pulse schedule; generating a display of channels associated with the pulse schedule; generating a display of conditional execution of the pulse schedule; computing phase change associated with the quantum device, and concurrently generating a visualization of the phase change with the visualization of the pulse schedule; and/or computing conditional pulse operations associated with the quantum device, and concurrently generating a visualization of the conditional pulse operations with the visualization of the pulse schedule.

In some embodiments, visualization system 102 can facilitate automated (e.g., without instruction from a human) visualization of one or more arbitrary pulse shapes that can be generated from a discrete data set and/or analytical formulation (e.g., Gaussian or hyperbolic-Tangent pulse shapes). In some embodiments, visualization system 102 can further facilitate automated visualization of one or more schedules of pulses (pulse schedules) that can be used to generate the gate dynamics of a quantum device (e.g., a quantum computer). In some embodiments, such schedules of pulses (pulse schedules) can comprise a collection of the arbitrary pulse shapes described above.

In some embodiments, visualization system 102 can facilitate automated (e.g., without instruction from a human) plotting of one or more arbitrary pulse shapes and/or one or more pulse schedules, where such arbitrary pulse shapes can be defined by a discrete set of amplitudes (e.g., a discrete set of complex amplitudes) or an analytic formula (e.g., Gaussian pulse shape). In some embodiments, visualization system 102 can further facilitate automated interpolation of discrete pulses using information obtained from a quantum device on which a pulse schedule is set to be run.

In some embodiments, visualization system 102 can further facilitate automated (e.g., without instruction from a human) computation and/or display of information including, but not limited to: time duration of pulse schedules; channels on which such pulse schedules act; information related to conditional execution (e.g., conditional pulse operations); phase changes; time-step set by control hardware (e.g., unit of time on hardware pulses); measurement time; buffer time (e.g., time in between pulses when converting from a quantum assembly language (qasm) model to a pulse model comprising, for instance, a sequence of pulses); a pulse library (e.g., a collection of default pulses that can be defined, calibrated, and/or periodically recalibrated to run on a certain quantum device); and/or other information.

As referenced herein, quantum assembly language (qasm) can comprise an instruction set that can indicate which qubit, which gate, and/or pairs of qubits to work on. As reference herein, a qubit can be represented as a vector that starts at the center of a sphere and points to the surface of the sphere (e.g., a Bloch sphere), where such vector can indicate what the qubit is doing. As reference herein, quantum assembly language (qasm) can comprise a concept of gates, where a gate can rotate the point of a vector representing the qubit to another location on the surface of such a sphere. As referenced herein, quantum assembly language (qasm) can comprise a sequence of gates, thereby comprising a gate-based model. As referenced herein, quantum assembly language (qasm) can comprise the canonical quantum computing model. Any gate can perform a rotation of such a vector representing a qubit. Having multiple gates on multiple qubits and arranging such gates and/or qubits in a specific order(s) can facilitate execution of a quantum computation.

In some embodiments, visualization system 102 can further facilitate automated visualization of such information described above along with (e.g., simultaneously with) such arbitrary pulse shapes and/or pulse schedules described above. In should be appreciated that visualization system 102 can provide a solution to the issue of complex pulse and pulse schedule visualization by automating the process starting from a pulse or collection of pulses, communicating with a quantum device and interpolating discrete data sets, if necessary, and plotting the pulse or pulse schedules in an automated manner (e.g., without instruction from a human).

In some embodiments, visualization system 102 can facilitate automated (e.g., without instruction from a human) generation of a visualization that can comprise pulse shapes and/or pulse schedules that can correspond to and/or be input to one or more input channels of one or more respective qubits of a quantum device (e.g., a quantum computer). In some embodiments, such pulse shapes can comprise defined pulse shapes, where one or more attributes of a pulse shape (e.g., shape, amplitude, length, etc.) can be defined by an entity (e.g., a human user). In some embodiments, such pulse schedules can comprise pulse schedules that can be generated by visualization system 102 (e.g., via plotting component 110 as described below) based on one or more control parameters of a quantum device (e.g., quantum device specification 118 described below), where such control parameters can comprise default pulse data of the quantum device. In some embodiments, such pulse schedules can further comprise one or more of the defined pulse shapes described above.

In some embodiments, such input channels described above can comprise electrical couplings (e.g., electrical connections) to one or more qubits of such a quantum device that can facilitate transmitting signals (e.g., microwave signals) comprising pulse shapes and/or pulse schedules to such one or more respective qubits of a quantum device (e.g., quantum device 116). In these embodiments, such pulse shapes and/or pulse schedules can constitute a computer program (e.g., a quantum-based computer program) that can be run on such a quantum device to perform one or more quantum computations and/or data processing.

In some embodiments, visualization system 102 can facilitate: creating a pulse schedule using information obtained from quantum device 116 (e.g., control parameters, pulse library, etc.); sending the pulse schedule to quantum device 116; obtaining result values as a return (e.g., result values of a quantum computation performed by quantum device 116 based on the pulse schedule); iterating through and modifying the pulse schedule (e.g., via interpolation of discrete data points obtained from quantum device 116) to generate a second pulse schedule; sending the second pulse schedule to quantum device 116; obtaining result values as a return (e.g., result values of a quantum computation performed by quantum device 116 based on the second pulse schedule); iterating through and modifying the second pulse schedule to generate a third pulse schedule and repeating these steps as needed. In some embodiments, visualization system 102 can provide visualizations of such pulse schedules between each iteration (e.g., visualizations 400, 500, 600, 700a, 700b, 700c, 800, etc.), where such pulse schedules can be used to implement pulse-level control of a quantum device (e.g., quantum device 116). In these embodiments, each of the visualizations can comprise a compilation of all pulse schedule data of a certain iteration, and/or other data related thereto, in a single visual display that can facilitate improved ingestion and/or interpretation of such data by an entity (e.g., a human user).

According to multiple embodiments, collection component 108 can receive a pulse schedule of pulse data and control parameters of a quantum device comprising default pulse data of the quantum device. For example, collection component 108 can receive a pulse schedule of pulse data (e.g., pulse definitions) that can be generated (e.g., via plotting component 110 as described below) based on information such as, for instance, control parameters of a quantum device (e.g., quantum device 116) that can comprise default pulse data of the quantum device. In some embodiments, collection component 108 can receive such control parameters by querying a quantum device as described below. In some embodiments, such a pulse schedule can be defined by a discrete set of amplitudes or an analytic formula (e.g., as described above). In some embodiments, such pulse data of a pulse schedule can comprise one or more pulse definitions that can comprise one or more attributes of a pulse (e.g., shape, amplitude, length, etc.), which can be defined by an entity (e.g., a human user). In some embodiments, such a pulse schedule comprising one or more pulse definitions can be referred to herein as pulse quantum object (qobj).

In some embodiments, collection component 108 can query a quantum device (e.g., quantum device 116) to obtain information about the quantum device. For example, collection component 108 can query an application programming interface (API) (not illustrated in the figures) that can obtain information such as, for instance, control parameters (e.g., a configuration file) of quantum device 116 including, but not limited to: time-step set by control hardware (e.g., unit of time on hardware pulses), measurement time, buffer time (e.g., time in between pulses when converting from a quantum assembly language (qasm) model to a pulse model), and/or a pulse library (e.g., a collection of default pulses that can be defined, calibrated, and/or periodically recalibrated to run on quantum device 116); select parameters (e.g., return values) about quantum device 116 that provide the pulses quantum device 116 supports; the time scales quantum device 116 supports; data about how the pulses are arranged; how many channels are allowed by quantum device 116; and/or other information. In some embodiments, such information (e.g., control parameters) about the quantum device (e.g., quantum device 116) can be obtained by collection component 108 from such a quantum device and used by plotting component 110 to construct one or more pulse schedules as described below.

In some embodiments, to facilitate querying a quantum device (e.g., quantum device 116) to obtain information about a quantum device such as, for instance, control parameters of the quantum device, collection component 108 can employ one or more application programming interface (API) calls to query the quantum device. In these embodiments, such a quantum device can generate the control parameters and transmit them (e.g., via a network such as, for example, the Internet) to a database (e.g., memory 104), which collection component 108 can query to obtain the control parameters. In some embodiments, the control parameters can be coded on the quantum device and change periodically (e.g., once a day, every time the quantum device is calibrated, etc.). For example, the quantum device can comprise a default set of pulses (also referred to herein as the pulse library), which can be an input to plotting component 110 to generate the pulse schedules. In some embodiments, such a default set of pulses can cause the quantum device to perform one or more certain actions. In some embodiments, the quantum device can have some small fluctuation on a time scale of 12-24 hours and thus, recalibration of what the instructions to the quantum device mean in terms of the default pulses can be required, so the default pulses can change (e.g., the default pulses can be recalibrated every time the quantum device is recalibrated). In some embodiments, the quantum device (e.g., quantum device 116) can transmit recalibrated pulses to the database described above (e.g., memory 104) where they can be queried by collection component 108. In some embodiments, due to such quantum device and/or pulse recalibrations, collection component 108 can query (e.g., via API calls) quantum device 116 and/or the database described above on a regular basis (e.g., once every minute, once every hour, once every day, etc.).

According to multiple embodiments, plotting component 110 can generate a plot of a pulse schedule based on pulse data of a pulse schedule and/or control parameters of a quantum device comprising default pulse data of the quantum device. For example, plotting component 110 can generate a plot of a pulse schedule (e.g., created by plotting component 110 as described below) based on pulse data of the pulse schedule (e.g., pulse definitions) and/or control parameters of a quantum device (e.g., control parameters of quantum device 116 that can be obtained by collection component 108), where such control parameters can comprise default pulse data of the quantum device (e.g., pulse library 312 described below).

In some embodiments, to facilitate generating a pulse schedule, plotting component 110 can extract one or more items from control parameters (e.g., a configuration file) corresponding to a quantum device (e.g., from the control parameters of quantum device 116 described above). For example, plotting component 110 can extract items including, but not limited to: time-step set by control hardware (e.g., unit of time on hardware pulses); measurement time; buffer time (e.g., time in between pulses when converting from a quantum assembly language (qasm) model to a pulse model); a pulse library (e.g., a collection of default pulses that can be defined, calibrated, and/or periodically recalibrated to run on a certain quantum device), and/or other items.

In some embodiments, to facilitate generating a pulse schedule, plotting component 110 can sort one or more pulses by channel (e.g., if time-ordered) and compute the length of the pulse schedule (e.g., using time or change in time (dt)). In some embodiments, to facilitate generating a pulse schedule, plotting component 110 can merge defined pulse definitions (e.g., defined by a human user) with the pulse library of the quantum device and interpolate discrete pulse data, if desired, where such discrete pulse data can comprise a collection of data points that when interpolated (e.g., via interpolation component 202 as described below with reference to FIG. 2) can constitute a Gaussian pulse.

In some embodiments, pulse files (pulses) obtained by collection component 108 from a quantum device (e.g., quantum device 116) can be provided in chronological order, with no additional structure and plotting component 110 can arrange such pulses to generate a pulse schedule. In some embodiments, plotting component 110 can arrange such pulses by utilizing information such as, for instance, control parameters obtained from quantum device 116 as described above that can provide data about which pulses come before and/or after a certain pulse. In some embodiments, plotting component 110 can layout the pulses according to channel, start time, and in embodiments where start times are dependent on previous channel pulses (e.g., persistent value pulses), compute the start time and/or end time of such pulses. In some embodiments, such ordering of the pulses can comprise a separate input file to plotting component 110 (e.g., separate from the pulse files and/or other information obtained from the quantum device), where such a separate input file can comprise the instruction set that can enable construction of a pulse schedule. In some embodiments, constructing the pulse schedule can constitute developing a quantum-based computer program to perform one or more quantum computations and/or data processing on the quantum device (e.g., quantum device 116) from which the parameters are obtained.

In some embodiments, to facilitate generating a pulse schedule, for example, a pulse schedule generated based on control parameters obtained from a quantum device (e.g., quantum device 116), plotting component 110 (and/or analysis component 204 described below with reference to FIG. 2) can calculate the phase change (also referred to herein as frame change) by computing the cumulative phase change on a given channel as a function of time and multiplying pulses at these times by the cumulated phase. As referenced herein, a phase change can comprise an exponential function (e.g., expressed as $e^{i \cdot \Theta}$) that can be represented by an arrow (e.g., a vector) in the x-y plane, where the amount of each x and y component can be determined by the angle $\Theta$ (theta), which can indicate the amount of real component and imaginary component. As referenced herein, phase change or frame change can mean that after some time t when the phase change occurs, the values of all pulses subsequent to the phase change (e.g., pulses after the time of the phase change) are modified, as they rotate into the complex plane (e.g., imaginary plane) and thereafter comprise a complex component and a real component. As a phase change (or a frame change) alters the pulses that come after the phase change, in some embodiments, the subsequent pulses can be modified by the action of the phase change, which can be performed by plotting component 110.

According to multiple embodiments, visualization component 112 can generate a display of a pulse schedule. For example, visualization component 112 can generate a visual display of a pulse schedule that can be generated by plotting component 110 (e.g., as described above) based on control parameters of quantum device 116. Examples of such a visual display can comprise visualizations 400, 500, 600, 700a, 700b, 700c, and/or 800 described below and illustrated in FIGS. 4, 5, 6, 7A, 7B, 7C, and/or 8, respectively. In some embodiments, visualization component 112 can render such a visual display (e.g., visualizations 400, 500, 600, 700a, 700b, 700c, and/or 800) on a display component (e.g., a monitor, a screen, output device 1040 described below with reference to FIG. 10, etc.) by employing a user interface of visualization system 102 (e.g., a graphical user interface (GUI)).

In some embodiments, visualization component 112 can generate a display of time duration of a pulse schedule. For example, visualization component 112 can generate a visual display of time duration (e.g., in terms of nanoseconds (ns)) of a pulse schedule that can be generated by plotting component 110 (e.g., as described above) based on control parameters of quantum device 116. Examples of such a visual display can comprise visualizations 400, 500, 600, 700a, 700b, 700c, and/or 800 described below and illustrated in FIGS. 4, 5, 6, 7A, 7B, 7C, and/or 8, respectively.

In some embodiments, visualization component 112 can generate a display of channels associated with a pulse schedule. For example, visualization component 112 can generate a visual display of channels (e.g., control channels, input channels, etc.) associated with a pulse schedule that can be generated by plotting component 110 (e.g., as described above) based on control parameters of quantum device 116. Examples of such a visual display can comprise visualizations 400, 500, 600, 700a, 700b, 700c, and/or 800 described below and illustrated in FIGS. 4, 5, 6, 7A, 7B, 7C, and/or 8, respectively.

In some embodiments, visualization component 112 can generate a display of conditional execution of a pulse schedule. For example, visualization component 112 can generate a visual display of conditional execution (e.g., a conditional pulse) of a pulse schedule that can be generated by plotting component 110 (e.g., as described above) based on control parameters of quantum device 116. An example of such a visual display can comprise visualization 700a described below and illustrated in FIG. 7A.

According to multiple embodiments, quantum device 116 can comprise a superconducting system. For example, quantum device 116 can comprise a superconducting system including, but not limited to, a quantum computing device (e.g., quantum computer, quantum processor, quantum hardware, quantum simulator, etc.), a superconducting chip, a superconducting quantum bit circuit (qubit circuit) fabricated on a semiconductor substrate (e.g., a silicon substrate), a circuit quantum electrodynamic (circuit-QED) system, and/or another superconducting system. In some embodiments, quantum device 116 can comprise one or more qubits that can be coupled (e.g., electrically) to visualization system 102 via one or more control channels (e.g., input channels) such as, for example, drive channel 306, measure channel 308, and/or additional control channel 310 as described below with reference to FIG. 3.

According to multiple embodiments, quantum device specification 118 can comprise information corresponding to quantum device 116. For example, quantum device specification 118 can comprise the control parameters of quantum device 116 described above. For instance, quantum device specification 118 can comprise control parameters (e.g., a configuration file) of quantum device 116 including, but not limited to: time-step set by control hardware (e.g., unit of time on hardware pulses), measurement time, buffer time (e.g., time in between pulses when converting from a quantum assembly language (qasm) model to a pulse model), and/or a pulse library (e.g., a collection of default pulses that can be defined, calibrated, and/or periodically recalibrated to run on quantum device 116); select parameters (e.g., return values) about quantum device 116 that provide the pulses quantum device 116 supports; the time scales quantum device 116 supports; data about how the pulses are arranged; how many channels are allowed by quantum device 116; and/or other information. Additionally, or alternatively, in some embodiments, quantum device specification 118 can further comprise one or more defined pulse files (e.g., defined pulse shapes that can be defined by an entity such as, for instance, a human user) and/or one or more pulse schedules (e.g., pulse schedules generated by plotting component 110 as described above).

Figure 2:
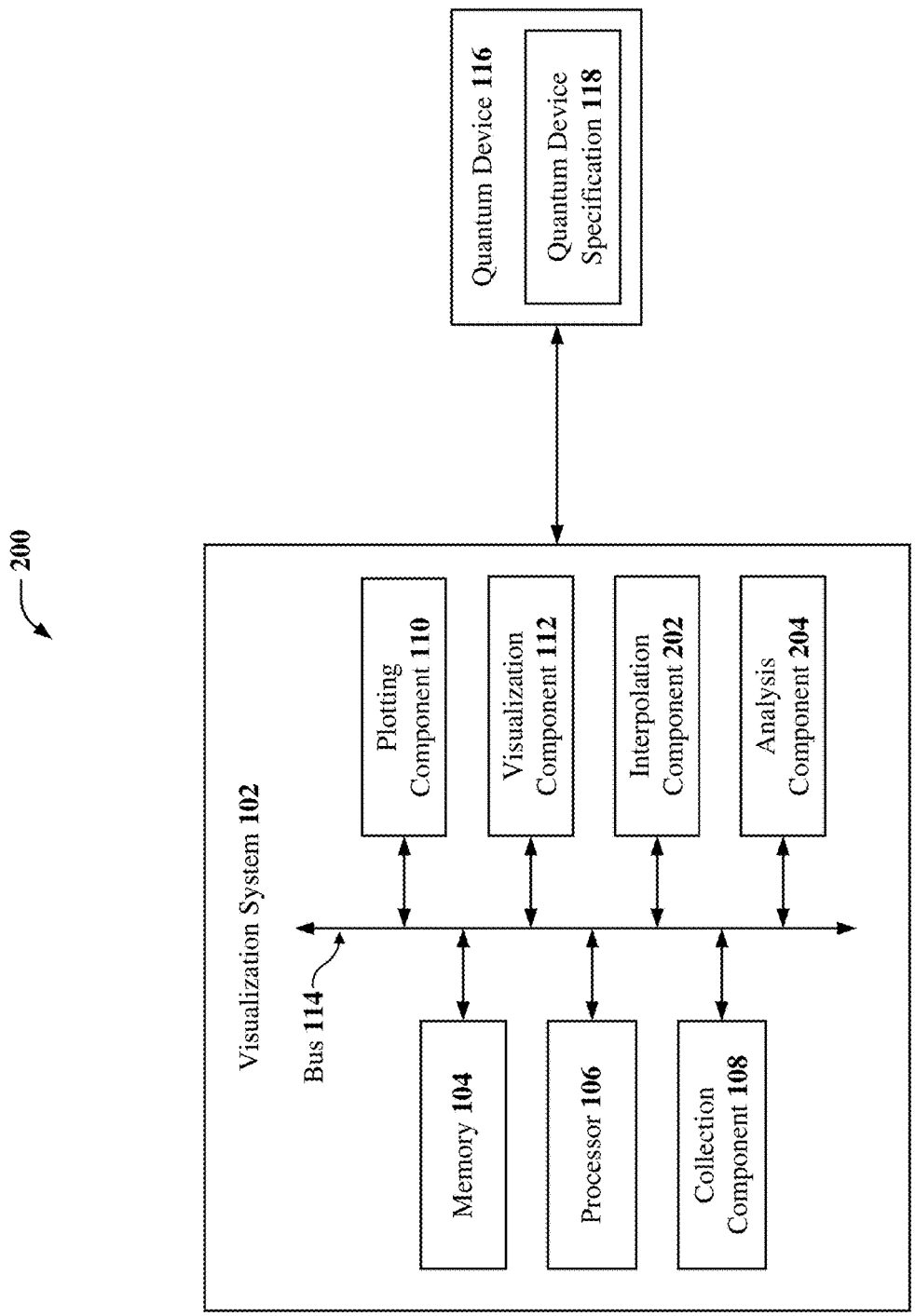
FIG. 2 illustrates a block diagram of an example, non-limiting system that can facilitate visualizing arbitrary pulse shapes and schedules in quantum computing applications in accordance with one or more embodiments described herein.

FIG. 2 illustrates a block diagram of an example, non-limiting system 200 that can facilitate visualizing arbitrary pulse shapes and schedules in quantum computing applications in accordance with one or more embodiments described herein. Repetitive description of like elements and/or processes employed in respective embodiments is omitted for sake of brevity. In some embodiments, system 200 can comprise visualization system 102, which can comprise an interpolation component 202 and/or an analysis component 204.

According to multiple embodiments, interpolation component 202 that interpolates discrete pulses received from a quantum device. For example, interpolation component 202 can interpolate discrete data points of one or more default pulses (e.g., the pulse library) obtained from quantum device 116 (e.g., via collection component 108 as described above with reference to FIG. 1), where such discrete data points can be derived from sampling an analytical mathematical function (e.g., Gaussian, hyperbolic-Tangent, and/or similar functions). In some embodiments, interpolation component 202 can interpolate such discrete data points of such one or more default pulses (e.g., the pulse library) obtained from quantum device 116 to generate smooth continuous functions such as, for example, Gaussian curves that can represent such default pulses.

According to multiple embodiments, analysis component 204 can compute phase change associated with a quantum device. For example, analysis component 204 can compute a phase change associated with a quantum device by employing a function (e.g., compute_frame_change) in Python. In some embodiments, analysis component 204 can employ such a function in Python to: compute values of pulses occurring after each phase change; compute how long a persistent value should last; and/or determine what is conditional and what is not. In some embodiments, performing such operations described here can constitute creating callable data structures (e.g., callable data structures of tables 404, 604, 704a, 704b, and/or 704c described below and illustrated in FIGS. 4, 6, 7A, 7B, and/or 7C, respectively.

In some embodiments, analysis component 204 can employ such a function in Python to compute a pulse value at a certain time t, where such a function can compute such a pulse value by determining whether one or more phase changes happen and accumulating all such phase changes, determining whether a pulse is a persistent value pulse, and/or determining other information. In some embodiments, such a function in Python that can be employed by analysis component 204 can perform such a pulse value computation described above and return a pulse value (e.g., point in time value) that can comprise a real component and an imaginary component (e.g., real pulse component 410 and complex pulse component 412, respectively, described below with reference to FIG. 4). In these embodiments, visualization component 112 can concurrently generate a visualization of the phase change with a visualization of the pulse schedule (e.g., via visualizations 400, 500, 600, 700*a*, 700*b*, 700*c*, and/or 800 as described below and illustrated in FIGS. 4, 5, 6, 7A, 7B, 7C, and/or 8, respectively).

In some embodiments, analysis component 204 can compute conditional pulse operations associated with a quantum device. For example, analysis component 204 can compute such conditional pulse operations associated with a quantum device by employing the function in Python described above. In this example, visualization component 112 can concurrently generate a visualization of the conditional pulse operations with a visualization of the pulse schedule (e.g., via visualization 700*a* and/or visualization 700*c* as described below and illustrated in FIGS. 7A and/or 7C, respectively).

Figure 3:
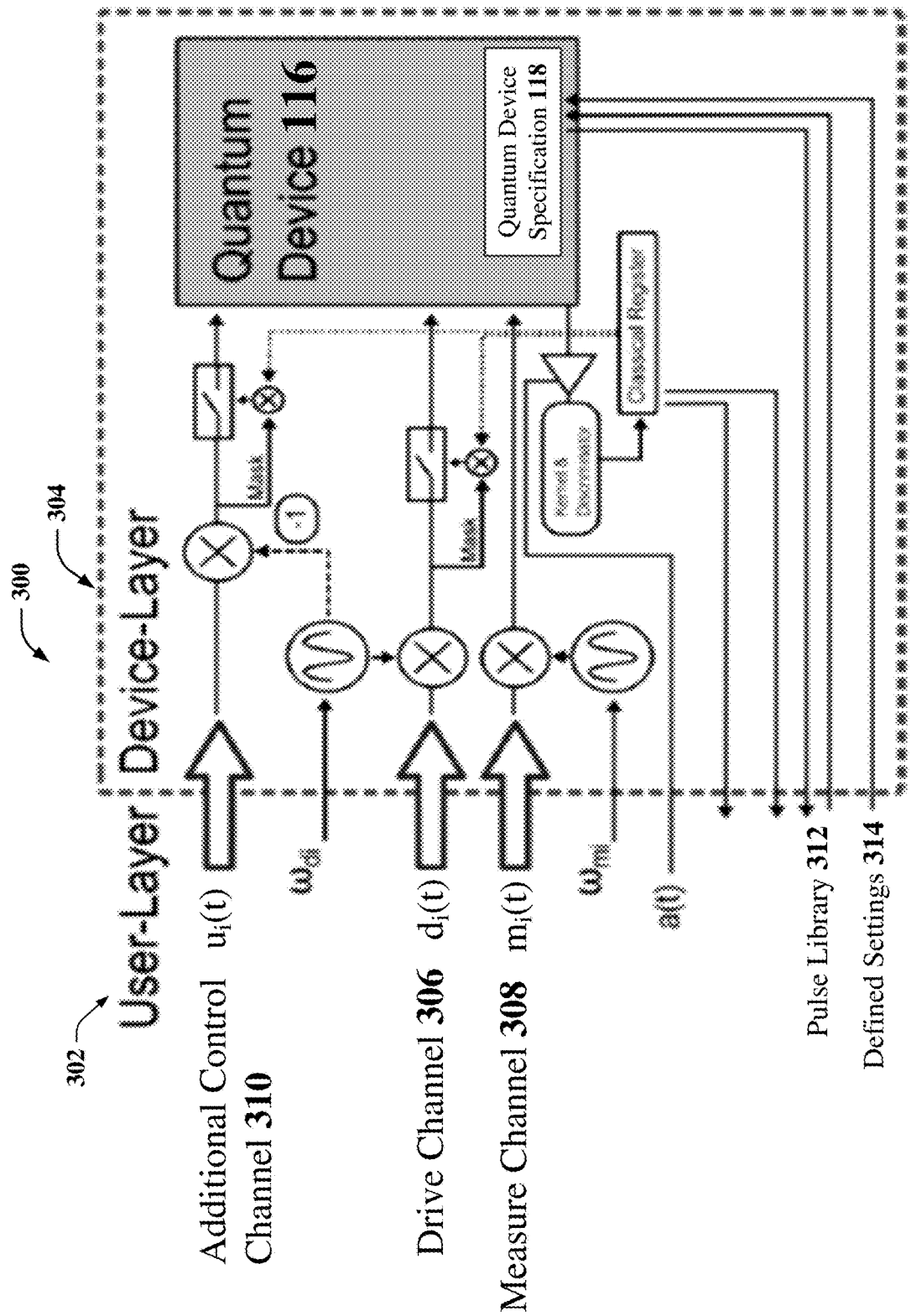
FIG. 3 illustrates a block diagram of an example, non-limiting system that can facilitate visualizing arbitrary pulse shapes and schedules in quantum computing applications in accordance with one or more embodiments described herein.

FIG. 3 illustrates a block diagram of an example, non-limiting system 300 that can facilitate visualizing arbitrary pulse shapes and schedules in quantum computing applications in accordance with one or more embodiments described herein. Repetitive description of like elements and/or processes employed in respective embodiments is omitted for sake of brevity.

In some embodiments, system 300 can comprise a user-layer 302, a device-layer 304, a drive channel 306 (denoted $d_i(t)$ in FIG. 3), a measure channel 308 (denoted $m_i(t)$ in FIG. 3), an additional control channel 310 (denoted $u_i(t)$ in FIG. 3), a pulse library 312, and/or defined settings 314. In some embodiments, system 300 can comprise an example, non-limiting alternative embodiment of system 100 and/or system 200, where user-layer 302 can comprise visualization system 102 and device-layer 304 can comprise quantum device 116, which can comprise quantum device specification 118.

In some embodiments, drive channel 306, measure channel 308, and/or additional control channel 310 can comprise input channels coupled (e.g., electrically) to one or more respective qubits of a quantum device (e.g., one or more respective qubits of quantum device 116), where such input channels can be used to control and/or measure such respective qubits. In some embodiments, each qubit of such a quantum device can be coupled (e.g., electrically) to a drive channel (e.g., drive channel 306), a measure channel (e.g., measure channel 308), and/or an additional control channel (e.g., additional control channel 310). In some embodiments, drive channel 306, measure channel 308, and/or additional control channel 310 can facilitate transmitting signals (e.g., microwave signals) comprising pulse shapes and/or pulse schedules to such one or more respective qubits of a quantum device (e.g., quantum device 116). In these embodiments, such pulse shapes and/or pulse schedules can constitute a computer program (e.g., a quantum-based computer program) that can be run on such a quantum device to perform one or more quantum computations and/or data processing.

In some embodiments, drive channel 306 can be used to drive (e.g., control) a qubit of a quantum device (e.g., quantum device 116). For example, drive channel 306 can be used to control a state of a qubit by inputting the one or more pulse shapes and/or pulse schedules into drive channel 306, where such state of a qubit can be represented by a vector on a sphere of radius 1 (e.g., a Bloch sphere of radius 1). In this example, since $+z=|0\rangle$ and $-z=|1\rangle$, this is called the z-representation. In this example, classically, a state of a qubit (also referred to herein as a state vector or a qubit state vector) can only point up or down and some quantum applications require rotating a state vector of a qubit to arbitrary points on the sphere. In this example, rotation of a qubit state vector can be performed by applying "gates", for instance, starting at $|0\rangle$. In this example, drive channel 306 can be utilized to drive a qubit by rotating the qubit state vector around the sphere (e.g., to apply gates). In some embodiments, with respect to an x-gate, drive channel 306 can be used to rotate $\pi$ around an x-axis of such a sphere. In some embodiments, with respect to a y-gate, drive channel 306 can be used to rotate $\pi$ around a y-axis of such a sphere. In some embodiments, with respect to a z-gate, drive channel 306 can be used to rotate $\pi$ around a z-axis of such a sphere. In some embodiments, with respect to a Hadamard Gate, drive channel 306 can be used to rotate the qubit state vector onto the equator of such a sphere (e.g., real quantum gate). For example, with respect to a Hadamard Gate, drive channel 306 can be used to rotate the qubit state vector around $(\hat{x}+\hat{z})/\sqrt{2}$ by $\pi$, which can provide a vector that points in the +x direction.

In some embodiments, measure channel 308 can be used to measure (e.g., via a readout device not illustrated in the figures) a qubit of a quantum device (e.g., quantum device 116). For example, measure channel 308 can be used to measure a state of a qubit (e.g., a quantum state, a logic state, etc.) of quantum device 116.

In some embodiments, additional control channel 310 can be used to drive (e.g., control) one or more parameters (e.g., quantum-based parameters) of a qubit in a quantum device (e.g., quantum device 116) and/or the quantum device itself. For example, additional control channel 310 can be used to control such one or more parameters of the qubit and/or the quantum device by inputting the one or more pulse shapes and/or pulse schedules into additional control channel 310.

In some embodiments, pulse library 312 can comprise one or more default pulse definitions (e.g., default pulse shapes, amplitude, length, etc.) of a certain quantum device (e.g., quantum device 116) that can be utilized (e.g., by visualization system 102, a human user, etc.) to implement certain operations on the quantum device. In these embodiments, such default pulse definitions can comprise the pulse definitions that can change every time the quantum device is recalibrated (e.g., once every hour, once every 24 hours, etc.), where such pulse definitions can constitute hardware defined pulse definitions that can be calibrated and recalibrated periodically for a certain quantum device (e.g., quantum device 116).

In some embodiments, defined settings 314 can comprise defined pulse shapes (also referred to herein as pulse definitions). For example, defined settings 314 can comprise defined pulse shapes, where one or more attributes of a pulse shape (e.g., shape, amplitude, length, etc.) can be defined by an entity (e.g., a human user).

Figure 4:
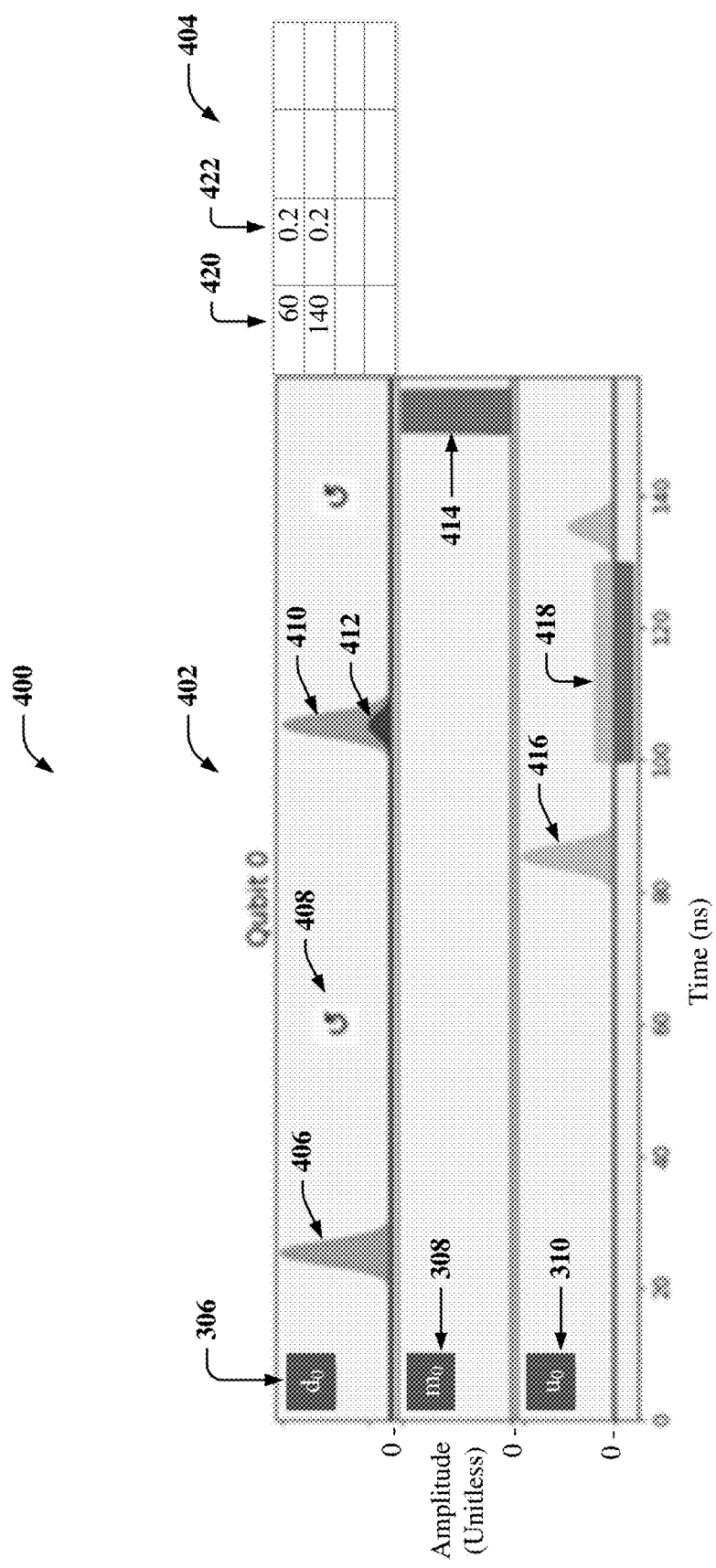
FIG. 4 illustrates an example, non-limiting visualization that can facilitate visualizing arbitrary pulse shapes and schedules in quantum computing applications in accordance with one or more embodiments described herein.

FIG. 4 illustrates an example, non-limiting visualization 400 that can facilitate visualizing arbitrary pulse shapes and schedules in quantum computing applications in accordance with one or more embodiments described herein. Repetitive description of like elements and/or processes employed in respective embodiments is omitted for sake of brevity.

In some embodiments, visualization 400 can comprise a plot 402 and a table 404. In some embodiments, plot 402 can comprise a plot of pulse schedule data that can correspond to one or more input channels coupled (e.g., electrically) to a qubit in a quantum device. For example, plot 402 can comprise a plot of pulse schedule data of drive channel 306, measure channel 308, and/or additional control channel 310 coupled (e.g., electrically) to a qubit (e.g., a qubit denoted as qubit 0) of a quantum device (e.g., quantum device 116).

In some embodiments, table 404 can comprise one or more callable data structures that can return the value of a channel (e.g., drive channel 306) at a given instance in time, where such data structures can account for phase changes and/or other special pulses that modify all subsequent pulses (e.g., pulses occurring at a later time). For example, table 404 can comprise time data 420 and/or phase angle data 422 as illustrated in FIG. 4, where such data can correspond to pulse schedule data of plot 402. For instance, in some embodiments, time data 420 can comprise a time of a phase change in a pulse schedule on drive channel 306 and phase angle data 422 can comprise a phase angle of such phase change expressed in terms of radians, for instance.

In some embodiments, the x-axis of plot 402 can represent time (e.g., nanoseconds (ns)). In some embodiments, the y-axis of plot 402 can represent amplitude of discrete pulses on each input channel. For example, the y-axis of plot 402 can represent amplitude of: pulse 406, real pulse component 410, and/or complex pulse component 412 of drive channel 306; measurement pulse 414 of measure channel 308; and/or additional control pulse 416 and/or persistent value pulse 418 of additional control channel 310. In some embodiments, the y-axis of plot 402 can comprise amplitude of discrete pulses in terms of a unitless value. In some embodiments, pulse 406, real pulse component 410, and complex pulse component 412 can comprise Gaussian pulses. In some embodiments, pulse 406, real pulse component 410, and complex pulse component 412 can collectively constitute an example of a pulse schedule as described herein in accordance with one or more embodiments of the subject disclosure.

In some embodiments, as described above, each qubit of a quantum device can have three (3) input channels coupled thereto (e.g., electrically). For example, qubit 0 of visualization 400 can be electrically coupled to drive channel 306, measure channel 308, and/or additional control channel 310 (e.g., denoted $d_0$, $m_0$, $u_0$ in FIG. 4), where such input channels can be used to control and/or measure qubit 0. In some embodiments, drive channel 306 ($d_0$) can be used to drive qubit 0 (e.g., control qubit 0). In some embodiments, measure channel 308 ($m_0$) can be used to do one or more measurements of qubit 0 (e.g., measurement of a quantum state or logic state of qubit 0), where measurement pulse 414 can represent such a measurement. In some embodiments, additional control channel 310 ($u_0$) can be similar to drive channel 306 and it can be used to control system parameters of qubit 0.

In some embodiments, phase change 408 can flip a qubit state vector from 0 to 1. In some embodiments, phase change 408 can implement a rotation of a subsequent pulse value into the complex plane (e.g., imaginary plane). For example, as illustrated by time data 420 and phase angle data 422 in table 404, at time=60 ns on plot 402, phase change 408 can implement a rotation of a subsequent pulse value by 0.2 radians, thereby generating real pulse component 410 and complex pulse component 412.

In some embodiments, persistent value pulse 418 can comprise a pulse having a fixed numerical value that can remain fixed for a time that can be determined based the timing of a pulse that follows such a persistent value pulse. For example, persistent value pulse 418 can comprise a fixed value pulse having variable length timing that can be determined based on the timing of the pulse following persistent value pulse 418.

Figure 5:
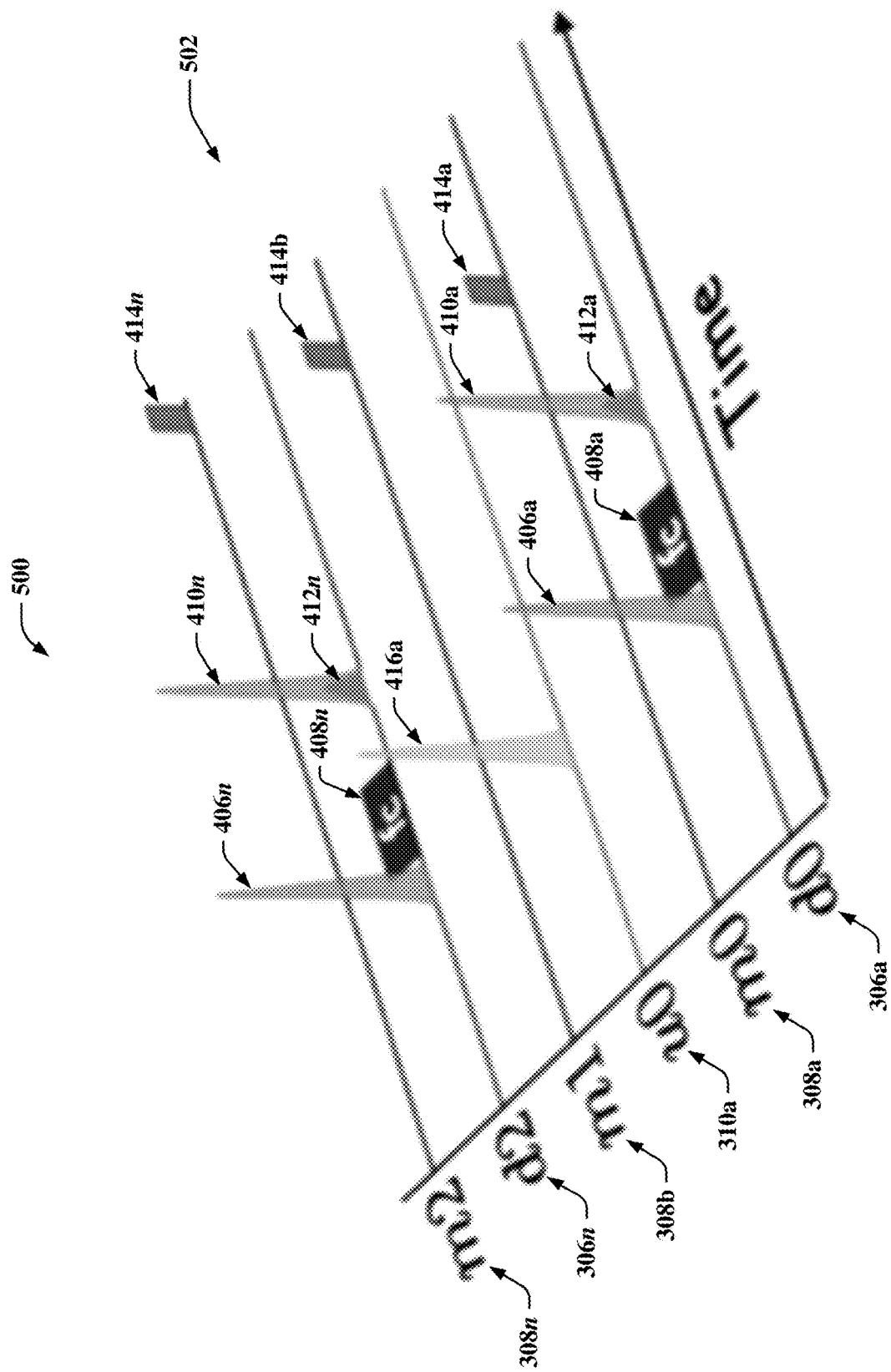
FIG. 5 illustrates an example, non-limiting visualization that can facilitate visualizing arbitrary pulse shapes and schedules in quantum computing applications in accordance with one or more embodiments described herein.

FIG. 5 illustrates an example, non-limiting visualization 500 that can facilitate visualizing arbitrary pulse shapes and schedules in quantum computing applications in accordance with one or more embodiments described herein. Repetitive description of like elements and/or processes employed in respective embodiments is omitted for sake of brevity.

In some embodiments, visualization 500 can comprise an example, non-limiting alternative embodiment of visualization 400, where plot 502 can comprise an example, non-limiting alternative embodiment of plot 402. In some embodiments, plot 502 can comprise a three-dimensional (3D) embodiment of plot 402. In some embodiments, plot 502 can comprise a plot of pulse schedule data that can correspond to one or more input channels coupled (e.g., electrically) to respective qubits in a quantum device. For example, plot 502 can comprise a plot of pulse schedule data of one or more drive channels 306a, 306n (e.g., respectively denoted as d0 and d2 in FIG. 5), one or more measure channels 308a, 308b, 308n (e.g., respectively denoted as m0, m1, and m2 in FIG. 5), and/or one or more additional control channels 310a (where n can represent a total quantity of such respective channels). In these embodiments, drive channel 306a, measure channel 308a, and/or additional control channel 310a can be coupled (e.g., electrically) to a first qubit (e.g., a qubit that can be denoted as qubit 0). In these embodiments, measure channel 308b can be coupled (e.g., electrically) to a second qubit (e.g., a qubit that can be denoted as qubit 1). In these embodiments, drive channel 306n and/or measure channel 308n can be coupled (e.g., electrically) to a third qubit (e.g., a qubit that can be denoted as qubit n).

In some embodiments, drive channels 306a, 306n can respectively comprise one or more pulses 406a, 406n, one or more phase changes 408a, 408n, one or more real pulse components 410a, 410n, and/or one or more complex pulse components 412a, 412n (where n can represent a total quantity of such components). In some embodiments, measure channels 308a, 308b, 308n can respectively comprise one or more measurement pulses 414a, 414b, 414n (where n can represent a total quantity of such components). In some embodiments, additional control channel 310a can comprise one or more additional control pulses 416a.

Figure 6:
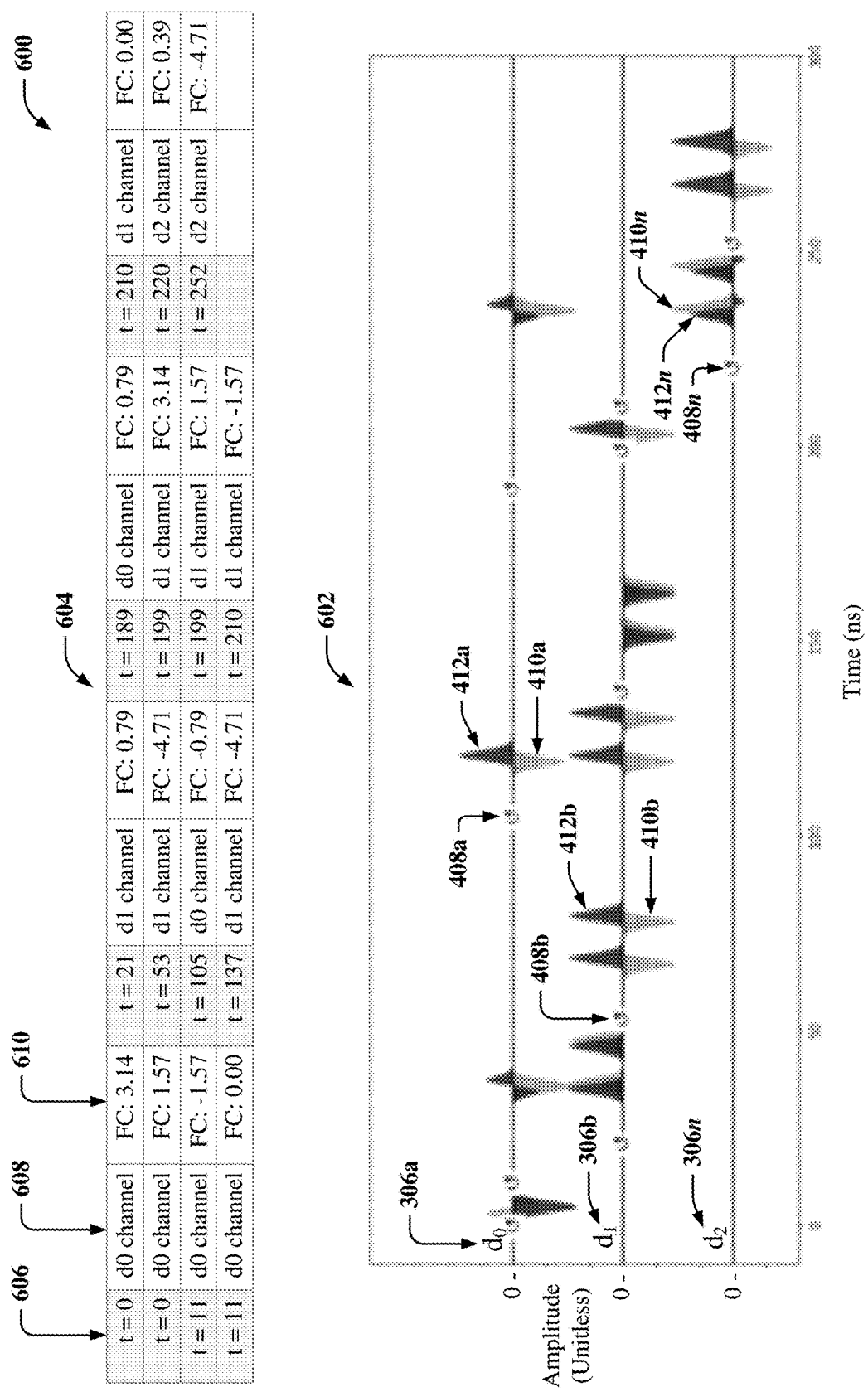
FIG. 6 illustrates an example, non-limiting visualization that can facilitate visualizing arbitrary pulse shapes and schedules in quantum computing applications in accordance with one or more embodiments described herein.

FIG. 6 illustrates an example, non-limiting visualization 600 that can facilitate visualizing arbitrary pulse shapes and schedules in quantum computing applications in accordance with one or more embodiments described herein. Repetitive description of like elements and/or processes employed in respective embodiments is omitted for sake of brevity.

In some embodiments, visualization 600 can comprise an example, non-limiting alternative embodiment of visualization 400 and/or visualization 500. In some embodiments, visualization 600 can comprise a plot 602 and/or a table 604. In some embodiments, plot 602 can comprise an example, non-limiting alternative embodiment of plot 402 and/or plot 502. In some embodiments, table 604 can comprise an example, non-limiting alternative embodiment of table 404.

In some embodiments, plot 602 can comprise a plot of pulse schedule data that can correspond to one or more drive channels coupled (e.g., electrically) to respective qubits in a quantum device. For example, plot 602 can comprise a plot of pulse schedule data of drive channels 306a, 306b, 306n (where n can represent a total quantity of drive channels 306) that can be coupled (e.g., electrically) to respective qubits of a quantum device (e.g., quantum device 116). In some embodiments, drive channel 306a (e.g., denoted as $d_0$ in FIG. 6) can be coupled (e.g., electrically) to a first qubit (e.g., a qubit that can be denoted as qubit 0). In some embodiments, drive channel 306b (e.g., denoted as $d_1$ in FIG. 6) can be coupled (e.g., electrically) to a second qubit (e.g., a qubit that can be denoted as qubit 1). In some embodiments, drive channel 306n (e.g., denoted as d2 in FIG. 6) can be coupled (e.g., electrically) to a third qubit (e.g., a qubit that can be denoted as qubit 2).

In some embodiments, table 604 can comprise one or more callable data structures that can return the value of one or more channels (e.g., drive channels 306a, 306b, 306n) at a given instance in time, where such data structures can account for phase changes and/or other special pulses that modify all subsequent pulses (e.g., pulses occurring at a later time). For example, table 604 can comprise time data 606, channel identity data 608, and/or phase angle data 610 as illustrated in FIG. 6, where such data can correspond to pulse schedule data of plot 602. For instance, in some embodiments, time data 606 can comprise a time of a phase change in a pulse schedule on a drive channel (e.g., drive channel 306a, 306b, 306n) and phase angle data 610 can comprise a phase angle of such phase change expressed in terms of radians, for instance.

Figure 7A:
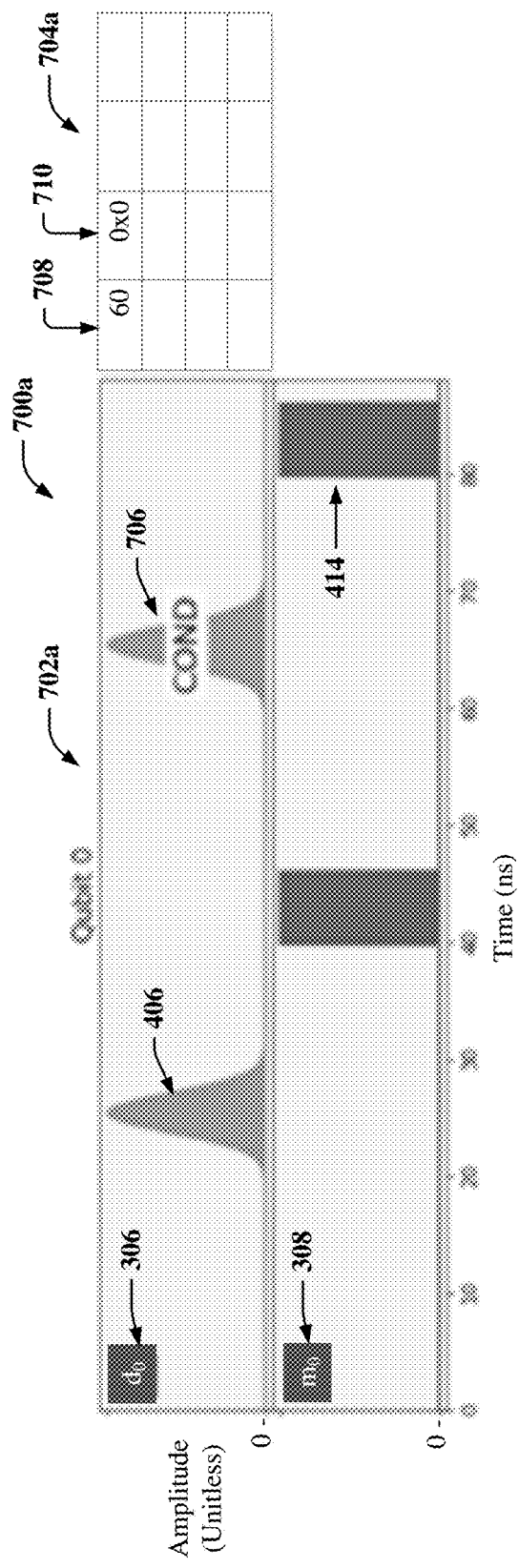
Figure 7B:
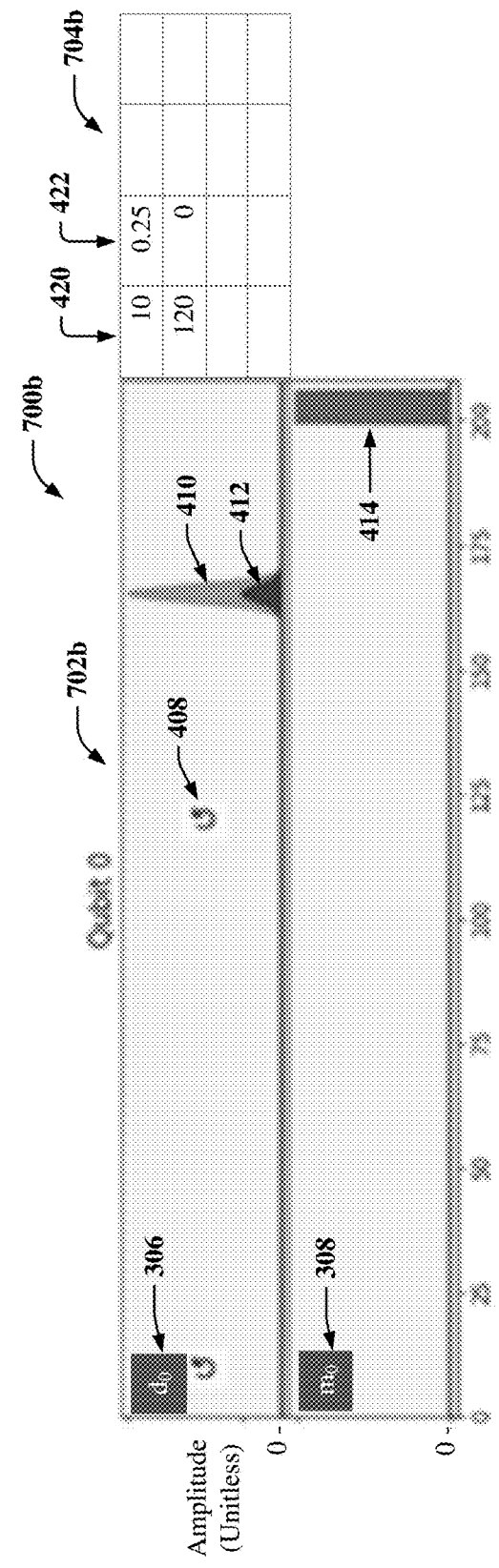

FIGS. 7A, 7B, and 7C illustrate example, non-limiting visualizations 700a, 700b, 700c that can facilitate visualizing arbitrary pulse shapes and schedules in quantum computing applications in accordance with one or more embodiments described herein. Repetitive description of like elements and/or processes employed in respective embodiments is omitted for sake of brevity.

In some embodiments, visualization 700a (FIG. 7A) can comprise an example, non-limiting alternative embodiment of visualizations 400, 500, and/or 600. In some embodiments, visualization 700a can comprise a plot 702a and/or a table 704a. In some embodiments, plot 702a can comprise an example, non-limiting alternative embodiment of plot 402 and/or plot 602. In some embodiments, table 704a can comprise an example, non-limiting alternative embodiment of table 404 and/or table 604.

In some embodiments, plot 702a can comprise a plot of pulse schedule data that can correspond to one or more input channels coupled (e.g., electrically) to a qubit in a quantum device. For example, plot 702a can comprise a plot of pulse schedule data of drive channel 306 and/or measure channel 308 that can be coupled (e.g., electrically) to a qubit (e.g., a qubit denoted as qubit 0) of a quantum device (e.g., quantum device 116). In some embodiments, plot 702a can comprise one or more conditional pulses 706 (e.g., denoted as COND in FIG. 7A). In some embodiments, conditional pulse 706 can provide information about how the quantum-based computer program described herein branches.

In some embodiments, table 704a can comprise one or more callable data structures that can return the value of one or more channels (e.g., drive channel 306) at a given instance in time, where such data structures can account for phase changes, conditional pulses, conditional pulse operations, and/or other special pulses that modify all subsequent pulses (e.g., pulses occurring at a later time). For example, table 704a can comprise time data 708 and/or conditional pulse data 710 as illustrated in FIG. 7A, where such data can correspond to pulse schedule data of plot 702a. For instance, in some embodiments, time data 708 can comprise a time of a conditional pulse (e.g., conditional pulse 706) in a pulse schedule on a drive channel (e.g., drive channel 306) and conditional pulse data 710 can comprise conditional pulse data of such conditional pulse (e.g., mask && register==value where mask, register, and value can be binary strings, arrays, of hex values).

In some embodiments, visualization 700b (FIG. 7B) can comprise an example, non-limiting alternative embodiment of visualizations 400, 500, 600, and/or 700a. In some embodiments, visualization 700b can comprise a plot 702b and/or a table 704b. In some embodiments, plot 702b can comprise an example, non-limiting alternative embodiment of plot 402, plot 602, and/or plot 702a. In some embodiments, table 704b can comprise an example, non-limiting alternative embodiment of table 404, table 604, and/or table 704a.

In some embodiments, visualization 700c (FIG. 7C) can comprise an example, non-limiting alternative embodiment of visualizations 400, 500, 600, 700a, and/or 700b. In some embodiments, visualization 700c can comprise a plot 702c and/or a table 704c. In some embodiments, plot 702c can comprise an example, non-limiting alternative embodiment of plot 402, plot 602, plot 702a, and/or plot 702b. In some embodiments, table 704c can comprise an example, non-limiting alternative embodiment of table 404, table 604, table 704a, and/or table 704b.

FIG. 8 illustrates an example, non-limiting visualization 800 that can facilitate visualizing arbitrary pulse shapes and schedules in quantum computing applications in accordance with one or more embodiments described herein. Repetitive description of like elements and/or processes employed in respective embodiments is omitted for sake of brevity.

In some embodiments, visualization 800 can comprise an example, non-limiting alternative embodiment of visualizations 400, 500, 600, 700a, 700b, and/or 700c. In some embodiments, visualization 800 can comprise an interactive visual display of a pulse schedule. In some embodiments, visualization 800 can comprise one or more interactive pulses 802 and/or interactive measurement pulses 804. In some embodiments, selection (e.g., by an entity such as, for instance, a human user) of such an interactive pulse 802 and/or an interactive measurement pulse 804 can cause visualization system 102 and/or visualization component 112 to display (e.g., in a subfigure) information corresponding to such an interactive pulse 802 and/or an interactive measurement pulse 804 (e.g., the pulse function, the Gaussian pulse, the amplitude, etc.). In some embodiments, visualization 800 can comprise one or more phase changes 806 that can be represented by vertical lines as illustrated in FIG. 8. In some embodiments, visualization 800 can comprise one or more conditional pulses 808, which can be represented by a pattern as illustrated in FIG. 8.

In some embodiments, visualization system 102 can be associated with various technologies. For example, visualization system 102 can be associated with quantum computing technologies, quantum computing architecture technologies, quantum hardware technologies, signal processing technologies, quantum computer programming technologies, superconducting quantum circuit technologies, quantum bit (qubit) technologies, circuit quantum electrodynamics (circuit-QED) technologies, and/or other technologies.

In some embodiments, visualization system 102 can provide technical improvements to systems, devices, components, operational steps, and/or processing steps associated with the various technologies identified above. For example, visualization system 102 can facilitate visualization of abstract pulses of a quantum computing model, thereby facilitating improved development of a quantum computing algorithm or a quantum computing device.

In some embodiments, visualization system 102 can provide technical improvements to a processing unit (e.g., processor 106) associated with a quantum computing device (e.g., a quantum processor, quantum hardware etc.), a circuit-QED system and/or a superconducting quantum circuit. For example, by generating visualizations of abstract pulses of a quantum computing model as described above, visualization system 102 can facilitate improved performance of such a processing unit (e.g., processor 106) by reducing the number of processing cycles such processing unit completes to develop and/or enable execution of a pulse schedule (e.g., a pulse-level quantum computing program) that can be executed by a quantum device. In some embodiments, an advantage of visualization system 102 is that it can facilitate generation and/or visualization of a pulse schedule that can be useful to an entity (e.g., a human user) developing quantum computing algorithms and/or quantum devices (e.g., quantum computers), as pulses of such pulse schedule are currently abstracted away in the standard quantum computing model (e.g., not visually displayed) where such entities manipulate gates, the pulses are underneath each gate, and the pulses do not necessarily correspond to the strict definition of a gate.

In some embodiments, visualization system 102 can employ hardware or software to solve problems that are highly technical in nature, that are not abstract and that cannot be performed as a set of mental acts by a human. In some embodiments, some of the processes described herein may be performed by one or more specialized computers (e.g., one or more specialized processing units, a specialized quantum computer, etc.) for carrying out defined tasks related to the various technologies identified above. In some embodiments, visualization system 102 or components thereof, can be employed to solve new problems that arise through advancements in technologies mentioned above, employment of quantum computing systems, cloud computing systems, computer architecture, and/or another technology.

It is to be appreciated that visualization system 102 can utilize various combinations of electrical components, mechanical components, and circuitry that cannot be replicated in the mind of a human or performed by a human, as the various operations that can be executed by visualization system 102 or components thereof as described herein are operations that are greater than the capability of a human mind. For instance, the amount of data processed, the speed of processing such data, or the types of data processed by visualization system 102 over a certain period of time can be greater, faster, or different than the amount, speed, or data type that can be processed by a human mind over the same period of time.

According to several embodiments, visualization system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that visualization system 102 can include information that is impossible to obtain manually by an entity, such as a human user. For example, the type, amount, or variety of information included in visualization system 102, collection component 108, plotting component 110, visualization component 112, quantum device 116, quantum device specification 118, interpolation component 202, and/or analysis component 204 can be more complex than information obtained manually by a human user.

Figure 9A:
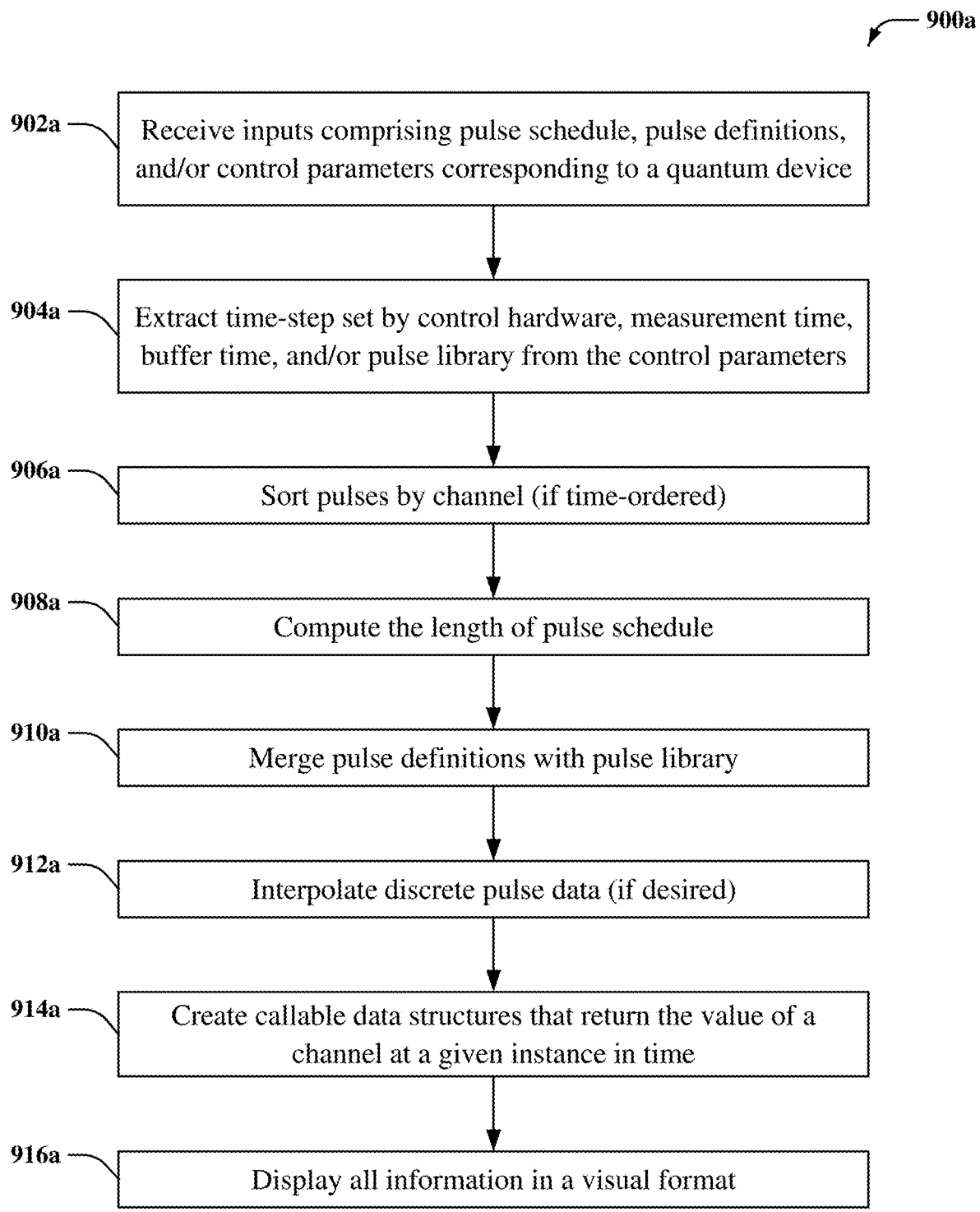
FIG. 9A illustrates a flow diagram of an example, non-limiting computer-implemented method that can facilitate visualizing arbitrary pulse shapes and schedules in quantum computing applications in accordance with one or more embodiments described herein.

FIG. 9A illustrates a flow diagram of an example, non-limiting computer-implemented method 900*a* that can facilitate visualizing arbitrary pulse shapes and schedules in quantum computing applications in accordance with one or more embodiments described herein. Repetitive description of like elements and/or processes employed in respective embodiments is omitted for sake of brevity.

In some embodiments, at 902*a*, the computer-implemented method can comprise receiving (e.g., via visualization system 102 and/or collection component 108) inputs comprising pulse schedule (e.g., a pulse schedule generated by plotting component 110), pulse definitions (e.g., pulse definitions defined by an entity such as, for instance, a human user), and/or control parameters corresponding to a quantum device (e.g., control parameters described above with reference to FIG. 1, quantum device specification 118, etc.).

In some embodiments, at 904*a*, the computer-implemented method can comprise extracting (e.g., via visualization system 102, collection component 108, and/or plotting component 110) time-step set by control hardware, measurement time, buffer time, and/or pulse library from the control parameters. For example, visualization system 102, collection component 108, and/or plotting component 110 can extract such information by reading (e.g., via processor 106) it from a configuration file (e.g., control parameters) obtained from quantum device or reading it from a file designed to model a quantum device.

In some embodiments, at 906*a*, the computer-implemented method can comprise sorting (e.g., via visualization system 102, collection component 108, and/or plotting component 110) pulses (e.g., pulse definitions and/or default pulses of a pulse library obtained by collection component 108 from a quantum device) by channel, if time-ordered (e.g., drive channel 306, measure channel 308, additional control channel 310, etc.). For example, visualization system 102, collection component 108, and/or plotting component 110 can sort such pulses by channel and/or start time (e.g., determine start time if pulse is dependent on previous pulses on same channel).

In some embodiments, at 908*a*, the computer-implemented method can comprise computing (e.g., via visualization system 102 and/or plotting component 110) the length of the pulse schedule.

In some embodiments, at 910*a*, the computer-implemented method can comprise merging (e.g., via visualization system 102 and/or plotting component 110) pulse definitions with pulse library (e.g., pulse library 312). For example, visualization system 102 and/or plotting component 110 can merge user pulse definitions and a quantum device pulse library (e.g., pulse library 312) into single data structure.

In some embodiments, at 912*a*, the computer-implemented method can comprise interpolating (e.g., via visualization system 102, plotting component 110, and/or interpolation component 202) discrete pulse data, if desired (e.g., discrete pulse data obtained by collection component 108 from a quantum device). For example, visualization system 102, plotting component 110, and/or interpolation component 202 can interpolate such discrete pulse data using polynomial interpolation (e.g., cubic-polynomial interpolation).

In some embodiments, at 914*a*, the computer-implemented method can comprise creating (e.g., via visualization system 102, plotting component 110, and/or analysis component 204) callable data structures (e.g., time data 420, phase angle data 422, time data 708, conditional pulse data 710, etc.) that return the value of a channel (e.g., drive channel 306, measure channel 308, additional control channel 310, etc.) at a given instance in time. For example, visualization system 102, plotting component 110, and/or analysis component 204 can create such callable data structures by composing callable data structures such as, for instance, functions built up from pulse schedule data (e.g., time data 420, phase angle data 422, time data 708, conditional pulse data 710, etc.) that return the value of a channel (e.g., drive channel 306, measure channel 308, additional control channel 310, etc.) at a given instance in time.

In some embodiments, at 916a, the computer-implemented method can comprise displaying all information in a visual format (e.g., via visualization system 102 and/or visualization component 112).

Figure 9B:
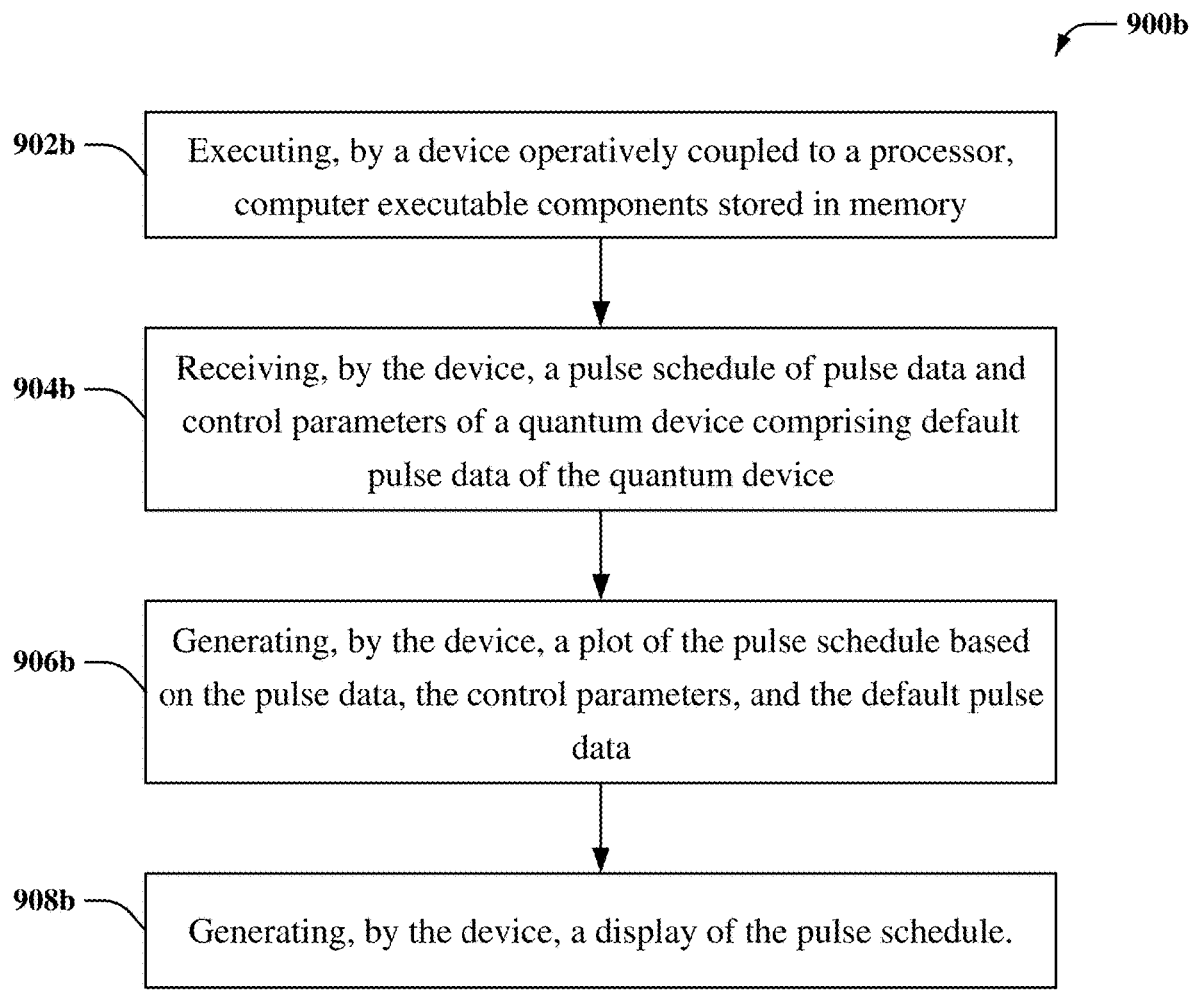
FIG. 9B illustrates a flow diagram of an example, non-limiting computer-implemented method that can facilitate visualizing arbitrary pulse shapes and schedules in quantum computing applications in accordance with one or more embodiments described herein.

FIG. 9B illustrates a flow diagram of an example, non-limiting computer-implemented method 900b that can facilitate visualizing arbitrary pulse shapes and schedules in quantum computing applications in accordance with one or more embodiments described herein. Repetitive description of like elements and/or processes employed in respective embodiments is omitted for sake of brevity.

In some embodiments, at 902b, the computer-implemented method can comprise executing, by a device operatively coupled to a processor (e.g., processor 106), computer executable components stored in memory (e.g., memory 104).

In some embodiments, at 904b, the computer-implemented method can comprise receiving (e.g., via visualization system 102 and/or collection component 108), by the device, a pulse schedule of pulse data (e.g., a pulse schedule generated by plotting component 110) and control parameters of a quantum device (e.g., control parameters described above with reference to FIG. 1, quantum device specification 118, etc.) comprising default pulse data (e.g., pulse library 312) of the quantum device.

In some embodiments, at 906b, the computer-implemented method can comprise generating (e.g., via visualization system 102 and/or plotting component 110), by the device, a plot of the pulse schedule (e.g., plots 402, 502, 602, 702a, 702b, 702c, and/or 800).

In some embodiments, at 908b, the computer-implemented method can comprise generating (e.g., via visualization system 102 and/or visualization component 112), by the device, a display of the pulse schedule (e.g., visualizations 400, 500, 600, 700a, 700b, 700c, and/or 800).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
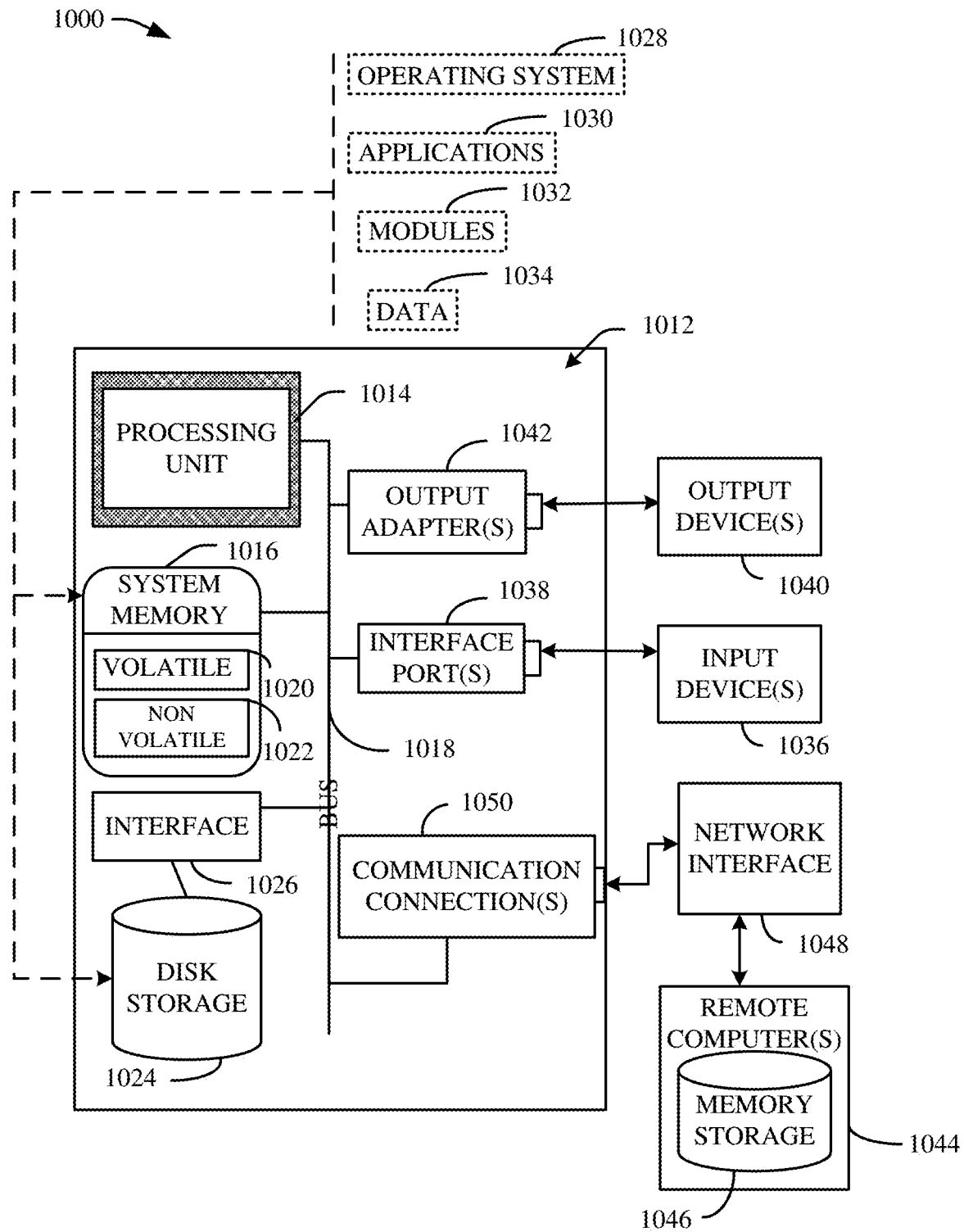
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor that executes computer executable components stored in memory;
    a collection component that receives a pulse schedule of pulse data and control parameters of a quantum device comprising default pulse data of the quantum device;
    a plotting component that generates a plot of the pulse schedule based on the pulse data, the control parameters, and the default pulse data; and
    a visualization component that generates a display of the pulse schedule.

2. The system of claim 1, wherein the pulse schedule is defined by a discrete set of amplitudes or an analytic formula.

3. The system of claim 1, further comprising an interpolation component that interpolates discrete pulses received from the quantum device.

4. The system of claim 1, wherein the visualization component generates a display of time duration of the pulse schedule.

5. The system of claim 1, wherein the visualization component generates a display of channels associated with the pulse schedule.

6. The system of claim 1, wherein the visualization component generates a display of conditional execution of the pulse schedule.

7. The system of claim 1, further comprising an analysis component that computes phase change associated with the quantum device, and the visualization component concurrently generates a visualization of the phase change with a visualization of the pulse schedule.

8. The system of claim 1, further comprising an analysis component that computes conditional pulse operations associated with the quantum device, and the visualization component concurrently generates a visualization of the conditional pulse operations with a visualization of the pulse schedule.

9. The system of claim 1, wherein the plotting component generates the plot of the pulse schedule and the visualization component generates the display of the pulse schedule to facilitate visualization of abstract pulses of a quantum computing model, thereby facilitating improved development of at least one of a quantum computing algorithm or a quantum computing device.

10. A computer-implemented method, comprising:
    executing, by a device operatively coupled to a processor, computer executable components stored in memory;
    receiving, by the device, a pulse schedule of pulse data and control parameters of a quantum device comprising default pulse data of the quantum device;
    generating, by the device, a plot of the pulse schedule based on the pulse data, the control parameters, and the default pulse data; and
    generating, by the device, a display of the pulse schedule.

11. The computer-implemented method of claim 10, wherein the pulse schedule is defined by a discrete set of amplitudes or an analytic formula.

12. The computer-implemented method of claim 10, further comprising interpolating, by the device, discrete pulses received from the quantum device.

13. The computer-implemented method of claim 10, further comprising generating, by the device, a display of time duration of the pulse schedule.

14. The computer-implemented method of claim 10, further comprising generating, by the device, a display of channels associated with the pulse schedule.

15. The computer-implemented method of claim 10, further comprising generating, by the device, a display of conditional execution of the pulse schedule.

16. The computer-implemented method of claim 10, further comprising computing, by the device, phase change associated with the quantum device, and concurrently generating a visualization of the phase change with the visualization of the pulse schedule.

17. The method of claim 10, further comprising computing, by the device, conditional pulse operations associated with the quantum device, and concurrently generating a visualization of the conditional pulse operations with the visualization of the pulse schedule.

18. A computer program product for generating a visualization associated with a quantum device, the computer program product comprising a computer readable storage medium having program instructions embodied therewith, the program instructions executable by a processor to cause the processor to:
- execute, by the processor, computer executable components stored in memory;
- receive, by the processor, a pulse schedule of pulse data and control parameters of a quantum device comprising default pulse data of the quantum device;
- generate, using the processor, a plot of the pulse schedule based on the pulse data, the control parameters, and the default pulse data; and
- generate, using the processor, a display of the pulse schedule.

19. The computer program product of claim 18, wherein the program instructions are further executable by the processor to cause the processor to interpolate, using the processor, discrete pulses received from the quantum device.

20. The computer program product of claim 18, wherein the program instructions are further executable by the processor to cause the processor to generate, using the processor, a display of time duration of the pulse schedule.

* * * * *